Feb. 7, 1950 J. C. BARTHO 2,496,263
STEERING APPARATUS FOR AUTOMOBILES
Filed Dec. 8, 1947 3 Sheets-Sheet 1
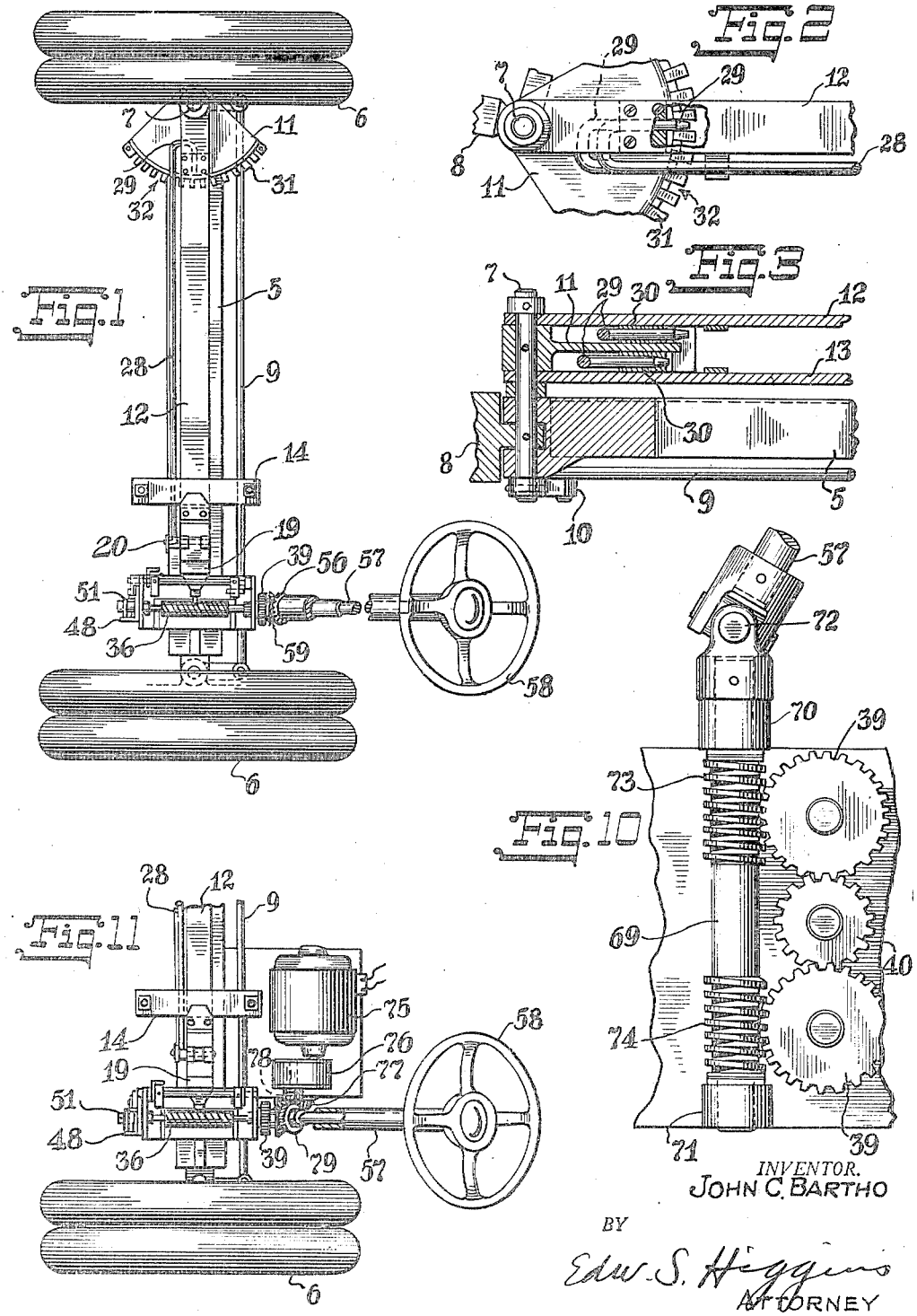
INVENTOR.
JOHN C. BARTHO
BY
Edw. S. Higgins
ATTORNEY Feb. 7, 1950 J. C. BARTHO 2,496,263
STEERING APPARATUS FOR AUTOMOBILES
Filed Dec. 8, 1947 3 Sheets-Sheet 2
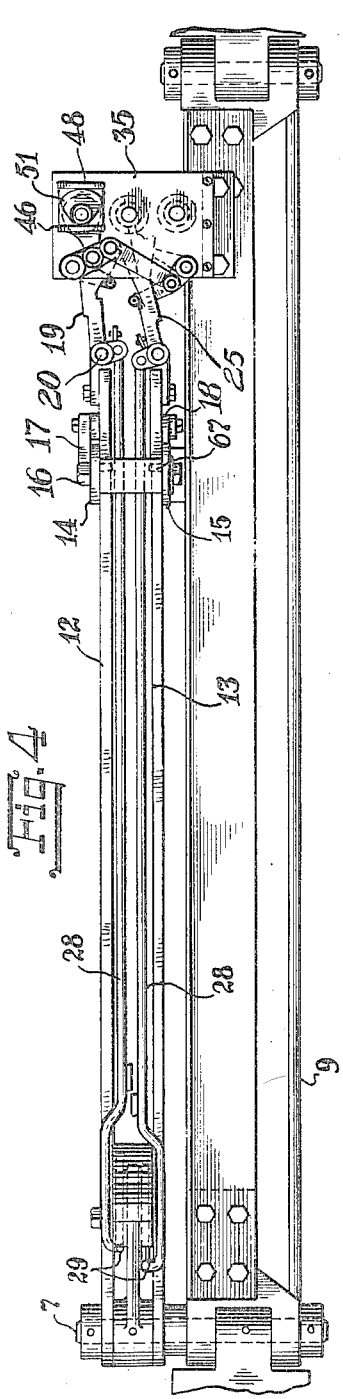
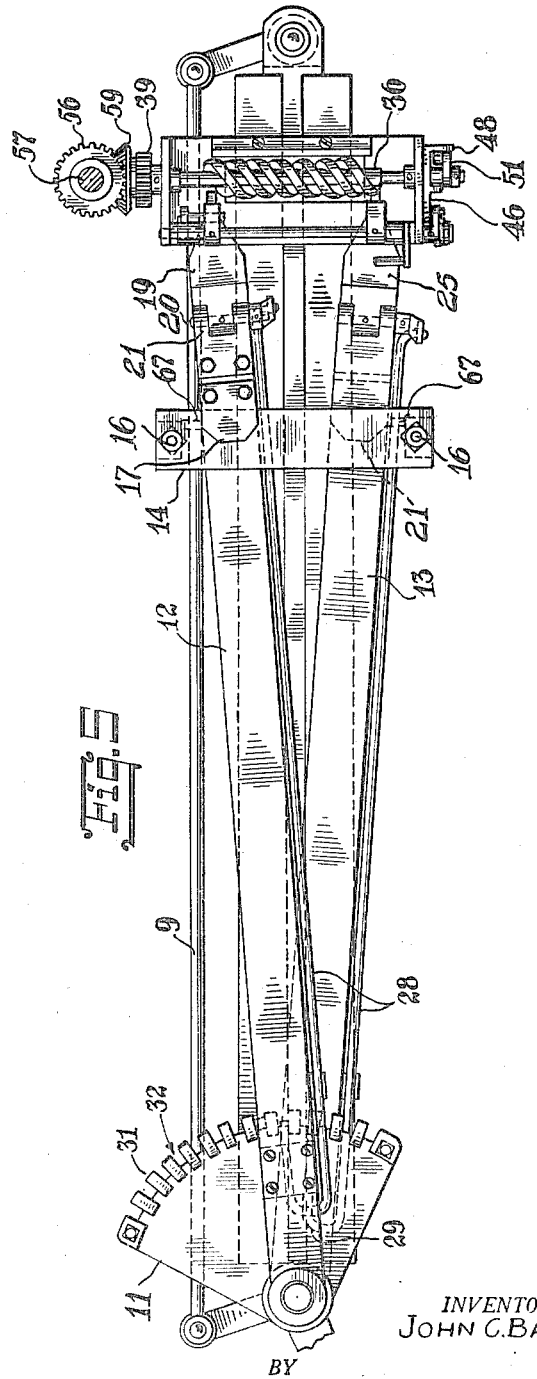
INVENTOR.
JOHN C. BARTHO
BY
Edw. S. Higgins
ATTORNEY

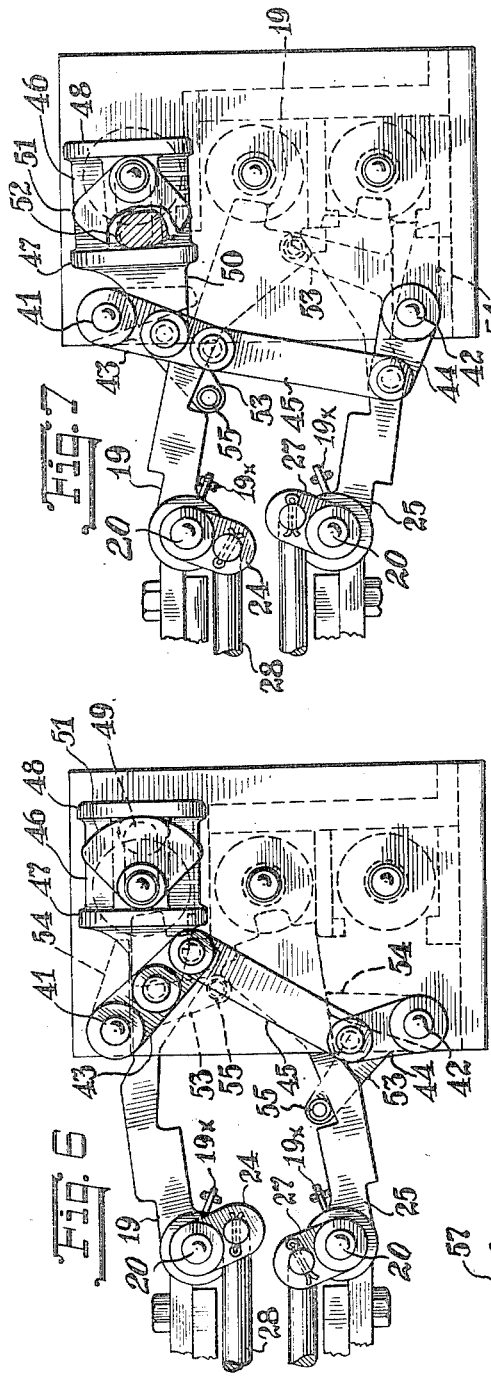
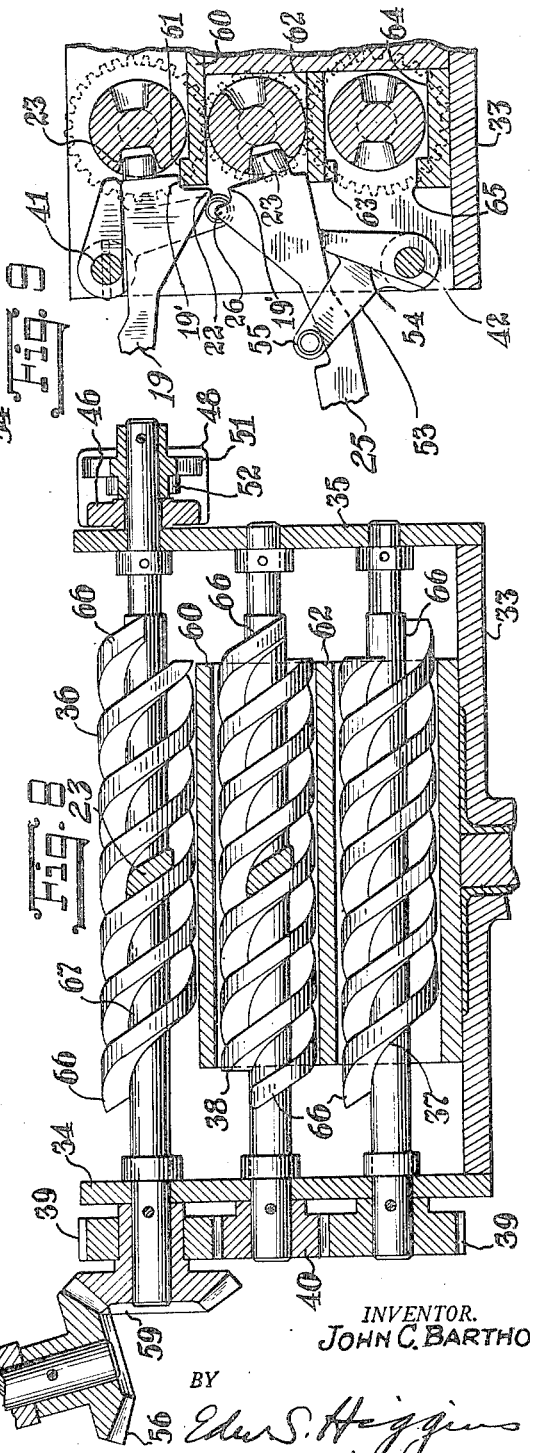

Patented Feb. 7, 1950

2,496,263

UNITED STATES PATENT OFFICE 2,496,263

STEERING APPARATUS FOR AUTOMOBILES

John C. Bartho, New York, N. Y., assignor of one-half to John Haranis, Astoria, N. Y.

Application December 8, 1947, Serial No. 790,421

8 Claims. (Cl. 280—96)

This invention relates particularly to power steering and driving mechanisms for automobiles and this application is a continuation in part of my copending application Serial Number 697,398, filed September 17, 1946, now Patent No. 2,432,369, granted Dec. 9, 1947.

Commercial trucks and passenger automobiles of today are made so large and heavy that it is only with great muscular effort and difficulty that the front steering wheels are able to be turned especially if the wheels are mired in the mud or the like or if the vehicle is standing still.

Furthermore because of the great manual strength needed for steering such vehicles, manufacturers of automobiles have found it impractical to mount heavy road wheels or more than a single road wheel at each end of the front axle and as a result it was necessary to limit carefully the load on said front or steering road wheels.

According to the present invention, road wheels of any desired size or of any number may be mounted on the front axle because manual strength as a factor in steering is reduced to a minimum. Furthermore the pay load may be distributed over the entire length of the automobile thereby permitting larger and heavier loads to be carried and thereby eliminating the necessity of trailers with extra wheels for taking up the load and thereby shortening the overall length of the vehicle with consequent saving in storage and parking space etc.

A prime object of the present invention is to provide mechanism for exerting a powerful leverage on the front road steering wheels.

Another object is to provide means for steering automobiles that is easy to manipulate and is positive in action.

A further object is to provide steering mechanism that is inexpensive to manufacture and that can be adapted to any standard type of front wheel mounting.

Other objects and advantages of my invention will be apparent from the description thereof to follow taken in connection with the accompanying drawings in which—

Fig. 1 is a top plan view of the front part of an automobile showing the mounting of the front road wheels and steering mechanism embodying my invention.

Fig. 2 is an enlarged fragmentary view showing in detail the connection between one of the steering levers and the gear segment.

Fig. 3 is a side view of the mechanism of Fig. 2.

Fig. 4 is an enlarged side view of the improved mechanism,

Fig. 5 is an enlarged top plan view of the mechanism of Fig. 4, showing the steering lever bars in moved positions.

Fig. 6 is an enlarged fragmentary side view showing in detail the mechanism for rocking the shafts for shifting the lever bars up and down and showing the lever bars connected to the upper and intermediate rotating worm members.

Fig. 7 is a view similar to Fig. 6 but showing the lever bars connected to the lower and intermediate rotating worm members.

Fig. 8 is an enlarged sectional view showing in detail the ends of the lever bars in the grooves of the rotating worm members.

Fig. 9 is a sectional view through the worm members showing the lever bars in the upper and intermediate worm members.

Fig. 10 is an enlarged fragmentary detail view showing a modified form of drive connection between the hand steering wheel and the road steering mechanism.

Fig. 11 is a fragmentary top plan view of another modification of the invention.

The improved steering mechanism is shown as mounted on the upper surface of a conventional front axle 5 of an automobile. The front road wheels 6 are mounted on the usual knuckle or king pins 7 supported by the usual knuckles 8. A tie rod 9 extending between the knuckle arms 10 connects the front road wheels in the usual manner.

A gear segment 11 is fastened to the king pin on one end of the axle at a point about midway the length of said pin. A long flat lever bar 12 has one end pivotally secured to the same king pin above but adjacent to the gear segment so that its under surface is adjacent to the upper surface of the gear segment. Another similar lever bar 13 also has one end pivotally secured to the king pin adjacent to but below the gear segment so that its upper surface is adjacent to the lower surface of the gear segment. The bars 12 and 13 extend along the front axle and are guided in their movements by a frame supported on the axle and comprising an upper cross rail 14 and a lower cross rail 15 fastened together at their ends by bolts 16. A plate member 17 secured to the bar 12 adjacent its free end coacts with the upper rail 14 for guiding said bar, and a similar plate 18 on the lower surface of lever bar 13 coacts with the lower rail 15 for guiding said bar 13 in its movements.

On the extreme free end of the upper lever bar 12 is a head member 19. This head member is fastened to a stub shaft or hinge pin 20 which is pivotally mounted in the bifurcated end 21 of the lever bar. The outer end of the head member is tapered edgewise as shown in Fig. 5 and the lower surface of said outer end is tapered downwardly as viewed in Fig. 9 terminating in a prong 22. A flat shoulder portion 19' is formed on said lower surface outwardly of the prong. A tooth 23 projects from the top edge of the outer face of the head member which tooth is substantially rectangular in cross-section and disposed at an angle to the axis of the head member as shown in Fig. 8. Secured to one of the outer ends of the stub shaft 20 is a downwardly extending lug or link 24.

On the extreme free end of the lower lever bar 13 is a pivoted head member 25 similar in construction to the head member 19 on the upper lever bar. The head member 25 however is so positioned that its inner surface tapers upwardly terminating in a prong 26 instead of downwardly as in the case of the head member 19. Its tooth 23 is also positioned at the lower edge of its outer face as viewed in Fig. 9. The lug or link 27 on its stub shaft 20 extends upwardly.

An elongated rod 28 extends along one edge of the lever bar 12 and has one end pivotally connected to the lower end of the downwardly extending lug 24 on the stub shaft 20. The opposite end of the rod extends above the upper surface of the gear segment 11 and is turned backwardly upon itself forming a hook member 29 with its free end in line with and adapted to slide through an opening in a guide block 30 fastened to the under surface of the lever bar 12 at a point to the rear of the teeth 31 of the segment gear 11, which teeth project upwardly from the upper surface gear of the segment and project downwardly from the lower surface thereof and are formed with slots 32 open from front to rear above and below said surface. When the head member is rocked upwardly on its hinge pin 20 and straightened out as shown in Fig. 6, it pulls the lower end of link 24 forwardly thereby pulling the hooked portion 29 of rod 28 forwardly through the guide block 30 and into one of the slots 32 between the teeth 31 above the surface of the gear segment whereby the gear segment is positively interlocked to the rod 28 and lever bar 12. When the head member is rocked downwardly as shown in Fig. 7, it pushes the lower end of link 24 rearwardly thereby pushing the hooked portion 29 of the rod 28 out of engagement with the teeth of the gear segment thereby disconnecting said gear segment from the lever bar.

A similar rod 28 has one end connected to the upper end of the upwardly extending link 27 of stub shaft 20 of lower lever bar 13 with the free end of its hooked portion 29 in line with and adapted to slide through the opening in the guide block 30 fastened to the upper surface of the lever bar 13 to the rear of the teeth of the segment gear. When the hooked portion of the rod is moved inwardly through the guide block, it is moved into engagement with one of the slots 32 between the teeth 31 of the gear segment below the lower surface of the gear segment whereby the gear segment is positively interlocked to the rod and lever bar 13.

The mechanism for moving the lever bars 12 and 13 is mounted on the end of the axle opposite the gear segment and comprises a frame including horizontally disposed rails or plates 33 secured to the axle and side plate or walls 34 and 35 at the outer ends of said rails. Journalled in the side walls are the shafts of an upper worm member 36, a lower worm member 37 and an intermediate or neutral worm member 38, said worm members being disposed in vertical alignment. The worm shafts extend outwardly through the side wall 34 and mounted on the extended ends of each of the shafts mounting the worm members 36 and 37 is a gear 39 of similar size, and mounted on the shaft mounting the intermediate worm member 38 is a gear 40 of smaller size, the three gears being in continuous mesh whereby when movement is imparted to one of said gears, for example, the gear on the shaft mounting the upper worm member 36 as shown in the drawings, all three of the worm members rotate simultaneously and in unison. However when the upper and lower worm members rotate in one direction for example clockwise as shown in Fig. 9, the intermediate or neutral worm member 38 rotates in the opposite direction or counterclockwise, and vice versa, as will be understood. The intermediate worm member 38 will also rotate at a greater speed than the other two worm members which rotate at the same speed.

Rockably mounted between the side walls 34 and 35 at the top thereof is a shaft 41 and at their bottom is another shaft 42. These shafts extend outwardly through the side wall 35. On the outer end of the upper shaft 41 is fixed one end of a link arm 43 and on the outer end of lower shaft 42 is fixed one end of a similar link arm 44. A lever 45 is pivotally connected at its ends to the other ends of arms 43 and 44 as shown in Figs. 6 and 7.

The shaft mounting the upper worm 36 extends outwardly through wall 35 and slidably mounted on the outer end of this shaft is a plate member 46. This plate is formed at its inner end with a flange 47 projecting outwardly of the plate and is formed at its outer end with a flange 48 projecting outwardly beyond the outer edge of flange 47. The plate is formed with a central elongated slot 49 extending substantially from flange to flange and extending through this slot is the protruding end of the shaft mounting the upper worm member 36. The inner end of the plate is formed with a perforated ear member 50 which is pivotally connected to the link arm 43 at a point thereon between its connection to the upper shaft 41 and the lever 45.

Fixed on the outer end of the shaft mounting the upper worm member 36 and outside of plate 46 is a cam member having a large cam face 51 and an integral smaller or shorter cam face 52. The cam member is so disposed on the shaft that its longer cam face 51 is adapted to ride over or engage the protruding portion of the outer flange 48 whereby the plate is moved outwardly of the shart or across the shaft but said longer cam face does not engage the inner shorter flange 47. The shorter cam face 52 in its movement rides over or engages the inner shorter flange 47 and moves the plate 46 inwardly across the shaft.

Fastened at each end of each of the upper and lower rockable shafts 41 and 42, respectively, just inside the side walls 34 and 35, is an outer lug or finger 53 projecting radially of the shaft and adjacent thereto is another lug or finger 54 extending at an obtuse angle to the lug 53, forming a sort of bell-crank lever arrangement. At its outer free end, each lug 53 is provided with a pin 55 extending inwardly of the walls 34 and 35, which pin is adapted to ride over the tapered surfaces and prongs of the head members of the lever bars. Each pin 55 may be enclosed in a roller to prevent wear thereon.

Movement or drive is brought to the gears on the shafts of the worm members by a pinion 56 fastened to the bottom end of the steering post 57 of the steering wheel 58, said pinion being in mesh with a pinion 59 on the outermost end of the shaft of worm member 36. It will be understood of course that the pinion 59 may be mounted on the shaft of the lower worm member or on the shaft of the intermidate worm member if desired, and that instead of manual movement by means of the steering wheel, the shaft of either worm member may be operatively connected to mechanism actuated by an electric motor or by an air turbine.

Disposed between the upper worm member 36 and the intermediate worm member 38 is a guide plate or rail 60 which extends inwardly slightly beyond said worm member in a horizontal plane and is provided with an upwardly extending flange 61 on its inner edge. Between the lower worm member and the intermediate worm member is another guide rail 62 similarly disposed and having a downwardly extending flange 63 at its inner edge. Another guide rail 64 is disposed below the lower worm member and has an upwardly extending flange 65. The guide rails 60 and 62 are not as long as the bodies of the upper and intermediate worm members, the ends of said rails terminating short of the ends of said worm members. However one thread of each worm member extends beyond the other threads on each side of its shaft as indicated at 66.

In operation, when the steering wheel 58 is turned for steering the vehicle, its movement is transmitted by the steering post 57 and pinion 56 to the pinion 59 and gear 39 on the shaft of the upper worm member 36 as shown in the drawing. Movement is thus imparted to all of the worm members through the intermeshing gears. Assuming that the head member 19 of the upper lever bar has been rocked upwardly and that its tooth 23 has been positioned in the groove of the thread of the upper worm member 36 and that the head member 25 of the lower lever bar 13 has been rocked upwardly and its tooth 23 positioned in the groove of the thread of the intermediate or neutral worm member 38 as shown in Figs. 6 and 8. Movement then of the upper worm member will cause the walls of the groove of its thread to move the tooth 23 of the upper lever bar along said worm member to the left, for example, as viewed in Fig. 8, carrying the lever bar 12 with its rod 28 along with it and inasmuch as the hooked rear end 29 of the rod has been connected to the gear segment, said gear segment will move to the left along with the lever bar 12. At the same time, movement of the intermediate worm member will cause the walls of the groove of its thread to move the tooth 23 of the lower lever bar 13 along said intermediate worm member to the right, for example, carrying the lever bar 13 with its rod 28 along with it and inasmuch as the rod 28 has been disconnected from the gear segment by the head member 25 pushing the upper end of link member 27 rearward with its attached rod 28 thereby moving the rear hooked end 29 of said rod away from the teeth of the gear segment, the movement of the lever bar 13 has no effect on the movement of the gear segment. The gear segment is thus moved to the left by the leftward movement of the upper lever bar 12.

When the tooth 23 of the head member of the upper lever bar 12 has reached the end of its leftward travel, for example, along the upper worm member 36 the tooth 23 of the head member of the lower lever bar 13 will have reached the end of its rightward travel, for example, along the intermediate worm member 38 as shown in Fig. 5. When in this position, the tooth 23 of the upper lever bar has moved beyond the left end of the wall or rail 60 and the outer end of the head member 19 is positioned beneath and in alinement with the finger 54 on the left hand end of the upper rockable shaft 41. The tooth 23 of the lower lever bar has moved beyond the right end of the rail 62 and head member 25 of the lower lever bar is positioned below the laterally extending pin 55 on the finger 53 of the lower rockable shaft 42. At this time, the long cam face 51 of the cam member will have rotated and moved into engagement with the flange 48 of the plate 46 thereby moving said plate forwardly over the shaft of the upper worm member thus rocking the upper rockable shaft 41 clockwise to move the finger 54 downwardly against the head member 19 of the upper lever bar 12 in order to rock said head member downwardly disconnecting its rod 28 from the gear segment and moving its tooth into alinement with the thread extension 66 on the intermediate worm member. At the same time, the lower rockable shaft 42 is rotated clockwise whereby the pin 55 on the finger 53 on said lower rockable shaft 42 is moved over the upper tapered surface and prong 26 of the head member 25 of the lower lever bar 13 as shown in Fig. 7 thereby forcing said head member downwardly connecting its rod 28 with the gear segment and moving its tooth 23 into position to be engaged by the extending thread portion 66 of the lower worm member. Rocking or pivotal movement of the head members 19 and 25 is limited by studs 19x on the lever bars (Figs. 6 and 7).

The small cam face 52 of the cam member is so proportioned and arranged that it holds momentarily the tooth 23 of each head member in position beyond the worm members to be engaged by the extension 66 of the associated worm member.

The pins 55 of the fingers 53 are so disposed relative to plate or rail 62 that the head member of the lower lever bar 13 is held either by one of said pins or by the rail in interlocking position as shown in dotted lines in Fig. 7.

With the teeth of the upper lever bar and the lower lever bar thus positioned in alinement with the thread extensions of the intermediate and lower worm members, respectively, continued rotation of the worm members causes the thread extension 66 of the intermediate worm member to engage and move the tooth 23 of the upper lever bar 12 into the groove of the thread on said intermediate worm member so that it will be moved to the right, for example, and causes the thread extension 66 of the lower worm member to engage and move the tooth 23 of the lower lever bar 13 into the groove of the thread on said lower worm member so that it will be moved to the left, for example. The gear segment is thus continued to be moved to the left by the lower lever bar the same as it was moved to the left by the upper lever bar, which movement is imparted to the road steering wheels to steer them to the left.

When the tooth 23 of the head member of the lower lever 13 has reached the end of its leftward travel as viewed in Fig. 8, for example, along the lower worm member, it will have moved beyond the left hand end of rail 62, and the tooth 23 of the head member of the upper lever bar 12 will have reached the end of its rightward travel in the intermediate worm member byond the right hand end of rail 60. The outer end of the head member of the lower lever bar 13 will then be positioned above and in alinement with the finger 54 of the lower rockable shaft 42, and the head member of the upper lever bar will be positioned above and in alinement with the inwardly extending pin 55 on the finger 53 of the upper rockable shaft 41. When the parts are in this position, the long cam face 51 of the cam member will have been rotated and moved into engagement with the flange 48 of the plate 46 thereby moving said plate forwardly as viewed in Figs. 4 and 6. This movement of plate 46 rotates the upper rockable shaft 41 counterclockwise as viewed in Fig. 7, thereby moving its inwardly extending pin 55 forwardly over the tapered surface and prong 22 of the head member of the upper lever bar 12 to rock said head member upwardly connecting the gear segment with said lever bar and positioning its tooth 23 in alinement with the thread extension 66 on the upper worm member ready to be engaged thereby. At the same time, the plate 46 rotates the lower rockable shaft 42 counter-clockwise in order to move its finger 54 upwardly against the under surface of the head member of the lower lever bar 13 thus rocking said head member and lifting its head member up so that it is disconnected from the gear segment and so that its tooth 23 is positioned in alinement with the extending thread portion 66 of the intermediate worm member ready to be engaged thereby. Continued rotation will thus cause the upper lever bar 12 to move to the left again along the upper worm member and cause the lower lever bar 13 to move to the right again along the intermediate worm member.

There is a positive push or pull on each of the rods 28 because of its rigid connection to its associated lever bar.

Movement along the worm members is limited in either direction by a stop member 67 fixed on the upper surface of the lower cross plate 15. These stop members also serve to position the tooth of each lever bar properly to be received by the rocking fingers of the rockable shafts 41 and 42.

When the head member 19 of the upper lever bar 12 moves along the upper worm member 36 and along the intermediate worm member 38, it is guided in its movement by its shoulder 19' sliding over the flange portion 61 of the rail 60 and over the inner edge of rail 62, respectively.

The head member of the lower lever bar 13 is guided in its movement along the lower worm member 37 by its shoulder 19' sliding over the flange 63 of rail 62.

The tooth 23 of the upper lever bar and the tooth 23 of the lower lever bar thus move back and forth in the grooves of the worm members, the tooth in the upper and lower worm members moving in one direction while the tooth in the intermediate worm member moves in the opposite direction. The hooked rear portion 29 of the rod 28 of either the upper lever bar or of the lower lever bar 13 is always interlocked with the gear segment. The lever bars when connected with the upper and lower worm members will always move in the same direction. For example, when the steering wheel is turned to the right, the tooth in the groove of the upper worm member or the tooth in the groove of the lower worm member will move to the right, while the tooth in the groove of the intermediate worm member will move to the left. There is thus a continuous movement to the right of the tooth 23 of the upper and tooth 23 of the lower lever bar in the upper and lower worm members. Similarly when the hand steering wheel is turned to the left, there is a continuous movement of said teeth with their lever bars to the left.

It will thus be seen that when the tooth 23 of the head member of one lever bar has finished its travel along either the upper or lower worm member, the tooth of the head member of the other bar is in the intermediate or neutral worm member and is carried along said neutral worm member to be in a position ready to be moved into either the upper or lower worm member for movement by said latter member, and when said latter lever bar is moved to operative connection with either said upper or lower worm member, the first-named lever bar is moved to inoperative position in the neutral worm member so that there is always one lever bar in operative connection with the gear segment, and the other lever bar is always out of operative connection therewith.

By reason of the present construction, a small movement on the hand steering wheel will exert a great leverage on the front road wheels whereby steering of such road wheels even under very heavy loads is facilitated.

In Fig. 10 is illustrated a modified arrangement for bringing the drive from the steering post 57 to the gears 39 and 40 consisting of a vertical worm shaft 69 journalled in upper and lower bearings 70 and 71, respectively. The upper end of the worm shaft is connected to the steering post by a universal joint 72. Spaced worm members 73 and 74 on the shaft engage the upper and lower gear members 39 for rotating the worm members.

In the form of the invention shown in Fig. 11, the steering post 57 is rotated by a motor 75 suitably mounted on the chassis of the automobile adjacent thereto. The drive from the motor is brought by means of reduction gearing 76 to a pinion 77 on shaft 78 and from said pinion 77 to a gear 79 fixed on the post. Suitable switching mechanism for controlling the motor may of course be mounted on the wheel 58 or post 57 within reach of the driver.

What I claim is:

1. In steering mechanism for automobiles, in combination, a hand steering wheel, upper, lower and intermediate worm members operatively connected to said hand steering wheel for rotation thereby, said upper and lower worm members being rotatable in the same direction and at the same speed and said intermediate worm member being rotatable in an opposite direction and at a greater speed than the other worm members, a gear segment, a pair of pivoted lever bars disposed between said worm members and said gear segment, each of said lever bars having a pivoted head member at one end thereof adapted to be detachably and selectively connected to one of said worm members, a rod disposed alongside each of said lever bars, one end of each rod being rigidly connected to one end of its associated bar and the other end of said rod being turned back on itself to form a hook adapted to be interlocked with said gear segment and front road steering wheels operatively connected to said gear segment.

2. In steering mechanism for automobiles, in combination, a hand steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted lever bars, the individual lever bars of said pair being disposed on different levels, a pivoted head member on one end of the upper lever bar, a tooth carried by said head member adapted to ride either in the groove in the upper worm member or in the groove in the intermediate worm member, a rod disposed alongside of said upper lever bar having one end connected to said head member, a pivoted head member on one end of the lower lever bar, a tooth carried by said latter head member adapted to ride either in the groove in the lower worm member or in the groove in the intermediate worm member, a rod disposed alongside of said lower lever bar having one end connected to said latter head member and a hooked end on the opposite end of each of said rods for selectively and detachably connecting the opposite ends of the lever bars with said gear segment for moving the latter, and front road steering wheels operatively connected to said gear segment.

3. In steering mechanism for automobiles, in combination, a hand steering wheel, upper, lower and intermediate worm members disposed in alignment and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted lever bars, means for detachably and selectively connecting one end of each of the lever bars to said gear segment, the individual lever bars of said pair being disposed on different levels, a pivoted head member on the other end of the upper lever bar, a tooth carried by said head member adapted to ride either in the groove in the upper worm member or in the groove in the intermediate worm member, a rod disposed alongside of said upper lever bar and having one end connected to said head member, a pivoted head member on the other end of the lower lever bar, a tooth carried by said latter head member adapted to ride either in the groove in the lower worm member or in the groove in the intermediate worm member, a rod disposed alongside of said lower lever bar having one end connected to said latter head member and means for moving each of said head members from the groove in one of the worm members to the groove in the adjacent worm member including a cam member on the shaft of the upper worm member, a plate adapted to be reciprocated by said cam member, an upper rockable shaft parallel to and adjacent the upper worm member, a lower rockable shaft parallel to and adjacent the lower worm member, linkage operatively connected to said rockable shafts and plate, fingers carried by said rockable shafts for moving said pivoted head members upwardly and downwardly, and front road steering wheels operatively connected to said gear segment.

4. In steering mechanism for automobiles, in combination, a hand steering wheel, upper, lower and intermediate worm members disposed in alinement and operatively connected to the steering wheel for rotation thereby, said upper and lower worm members being rotatable in the same direction and at the same speed and said intermediate worm member being rotatable in the opposite direction and at a greater speed than the other worm members, a gear segment, a pair of pivoted lever bars, the individual lever bars of said pair being disposed on different levels, a pivoted head member on one end of the upper lever, a tooth carried by said head member adapted to ride in the groove in the upper worm member and in the groove in the intermediate worm member, a pivoted head member on one end of the lower lever, a tooth carried by said latter head member adapted to ride either in the groove in the lower worm member or in the groove in the intermediate worm member, means for moving each of said head members from the groove in one of the worm members to the groove in the adjacent worm member including a cam member on the shaft of the upper worm member, a plate adapted to be reciprocated by said cam member, an upper rockable shaft parallel to and adjacent the upper worm member, a lower rockable shaft parallel to and adjacent the lower worm member, linkage operatively connected to said rockable shaft and plate, fingers carried by said rockable shafts for moving said pivoted head members upwardly and downwardly, means for detachably and selectively connecting the opposite ends of said lever bars with said gear segment for moving the latter and front road steering wheels operatively connected to said gear segment.

5. In steering mechanism for automobiles, in combination, a steering wheel, upper, lower and intermediate worm members operatively connected to said steering wheel for rotation thereby, said upper and lower worm members being rotatable in the same direction and at the same speed and said intermediate worm member being rotatable in an opposite direction and at a greater speed than the other worm members, a gear segment, a pair of pivoted lever bars disposed between said worm members and said gear segment, each of said lever bars having a pivoted head member at one end thereof adapted to be detachably and selectively connected to one of said worm members, a rod alongside each of said lever bars having one end connected to the head member thereof and having its other end hooked and adapted to be moved into a slot between the teeth of the gear segment for connecting said gear segment with the head member and front steering wheels operatively connected to said gear segment.

6. In steering mechanism for automobiles, in combination, a hand steering wheel, upper, lower and intermediate worm members disposed in alinement and operatively connected to the hand steering wheel for rotation thereby, said upper and lower worm members being rotatable in the same direction and at the same speed and said intermediate worm member being rotatable in the opposite direction and at a greater speed than the other worm members, a gear segment having teeth protruding above and below its surface, a pair of pivoted lever bars, the individual lever bars of said pair being disposed on different levels, a pivoted head member on one end of the upper lever bar, a tooth carried by said head member adapted to ride in the groove in the upper worm member and in the groove in the intermediate worm member, a pivoted head member on one end of the lower lever bar, a tooth carried by said latter head member adapted to ride in the groove in the lower worm member and in the groove in the intermediate worm member, a rod alongside of each of said lever bars and having its front end connected to the head member of its associated lever bar, a hook formed on the rear end of each rod and disposed behind the teeth of the gear segment, the hook of the upper rod being adapted to engage the slots between the teeth protruding from the upper surface of the gear segment and the hook of the lower rod being adapted to engage the slots between the teeth protruding below the lower surface of the gear segment and front road steering wheels operatively connected to said gear segment.

7. In steering mechanism for automobiles, in combination, a hand steering wheel, upper, lower and intermediate worm members disposed in alinement and operatively connected to the steering wheel for rotation thereby, said upper and lower worm members being rotatable in the same direction and at the same speed and said intermediate worm member being rotatable in the opposite direction and at a greater speed than the other worm members, a gear segment having teeth protruding above and below its surface, a pair of pivoted lever bars, the individual bars of said pair being disposed on different levels, a pivoted head member on one end of the upper lever bar, a tooth carried by said head member adapted to ride in the groove in the upper worm member and in the groove in the intermediate worm member, a pivoted head member on one end of the lower lever bar, a tooth carried by said latter head member adapted to ride in the groove in the lower worm member and in the groove in the intermediate worm member, upper and lower rockable shafts adjacent the upper and lower worm members, respectively, a cam member on the outer end of the shaft mounting the upper worm member, said cam member having a long cam face and a short cam face, linkage connecting said rockable shafts, a slidable plate adapted to be moved by said cam faces, a rigid connection between said plate and said linkage whereby said linkage is actuated, a pair of angularly disposed fingers at each end of each of said rockable shafts adapted to be moved by operation of said shafts for moving the tooth of a head member from the groove in one worm member to the groove in the adjacent worm member, a rod alongside each of said lever bars having one end connected to the head member thereof and having its other end hooked and adapted to be moved into a slot between the teeth of the gear segment for connecting said gear segment with the head member and front road steering wheels operatively connected to said gear segment.

8. In steering mechanism for automobiles, in combination, a hand steering wheel, upper, lower and intermediate worm members disposed in alinement and operatively connected to the hand steering wheel for rotation thereby, said upper and lower worm members being rotatable in the same direction and at the same speed and said intermediate worm member being rotatable in the opposite direction and at a greater speed than the other worm members, a gear segment having teeth protruding above and below its surface, a pair of pivoted lever bars, the individual bars of said pair being disposed on different levels, a pivoted head member on one end of the upper lever bar, a tooth carried by said head member adapted to ride in the groove in the upper worm member and in the groove in the intermediate worm member, a pivoted head member on one end of the lower lever bar, a tooth carried by said latter head member adapted to ride in the groove in the lower worm member and in the groove in the intermediate worm member, rockable shafts disposed adjacent to said upper and lower rockable worm members, a pair of angularly disposed fingers carried by said shafts and adapted to engage the head members of the lever bars for moving the teeth of said head members from one worm member to the adjacent worm member, a rod alongside each of said lever bars and having its front end connected to the head member of its associated lever bar, a hook formed on the rear end of each rod and disposed behind the teeth of the gear segment, the hook of the rod alongside of the upper lever bar being adapted to engage the slots between the teeth protruding above the upper surface of the gear segment and the hook on the other rod adapted to engage in the slots between the teeth protruding below the lower surface of the gear segment whereby said gear segment is selectively connected to the hand steering wheel and front road steering wheels operatively connected to said gear segment.

JOHN C. BARTHO.

REFERENCES CITED

The following references are of record in the file of this patent:

UNITED STATES PATENTS

| Number | Name | Date |
| --- | --- | --- |
| 464,246 | Dewey | Dec. 1, 1891 |
| 1,144,552 | Lardner et al. | Jan. 29, 1915 |
| 1,364,872 | Feightner | Jan. 11, 1921 |
| 1,665,974 | Nycz | Apr. 10, 1928 |
| 1,948,487 | Berry | Feb. 27, 1934 |
| 2,054,877 | Eastman | Sept. 22, 1936 |
| 2,432,369 | Bartho | Dec. 9, 1947 |